N. MARTINEZ.
TRANSMISSION MECHANISM.
APPLICATION FILED MAR. 31, 1914.
1,112,375.
Patented Sept. 29, 1914.
3 SHEETS—SHEET 1.
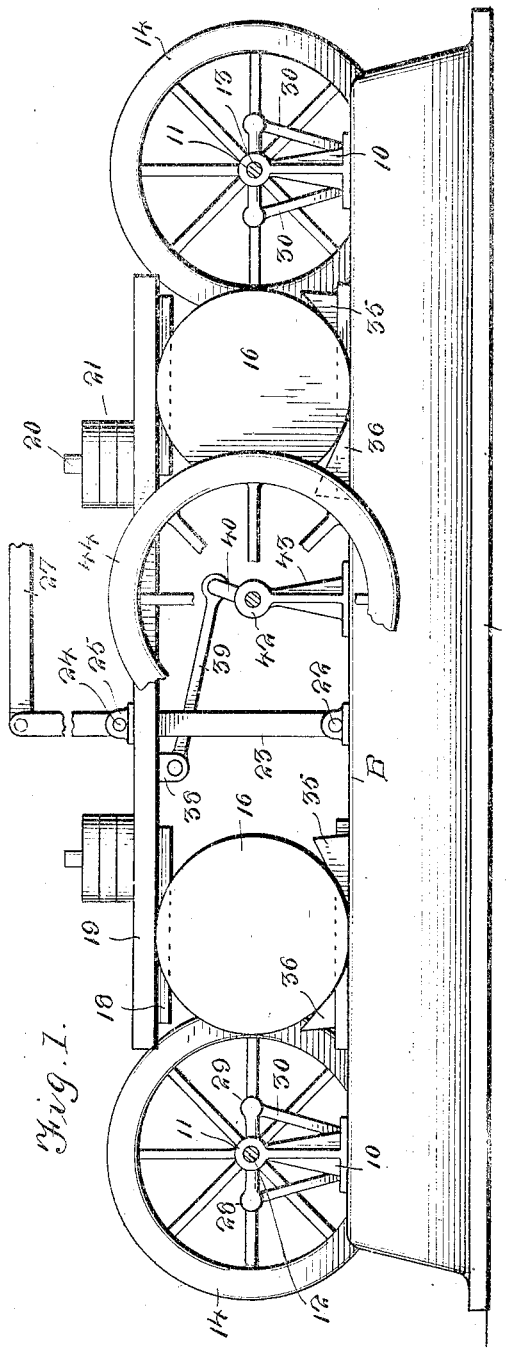
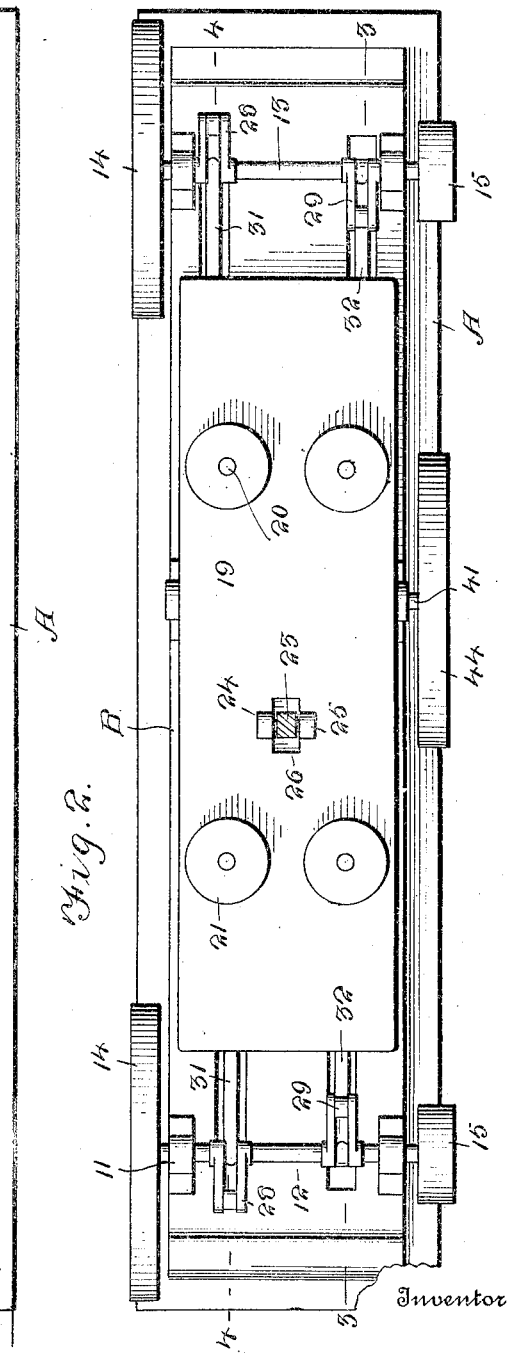
Inventor
Norberto Martinez
By Victor J. Evans
Attorney
Witnesses

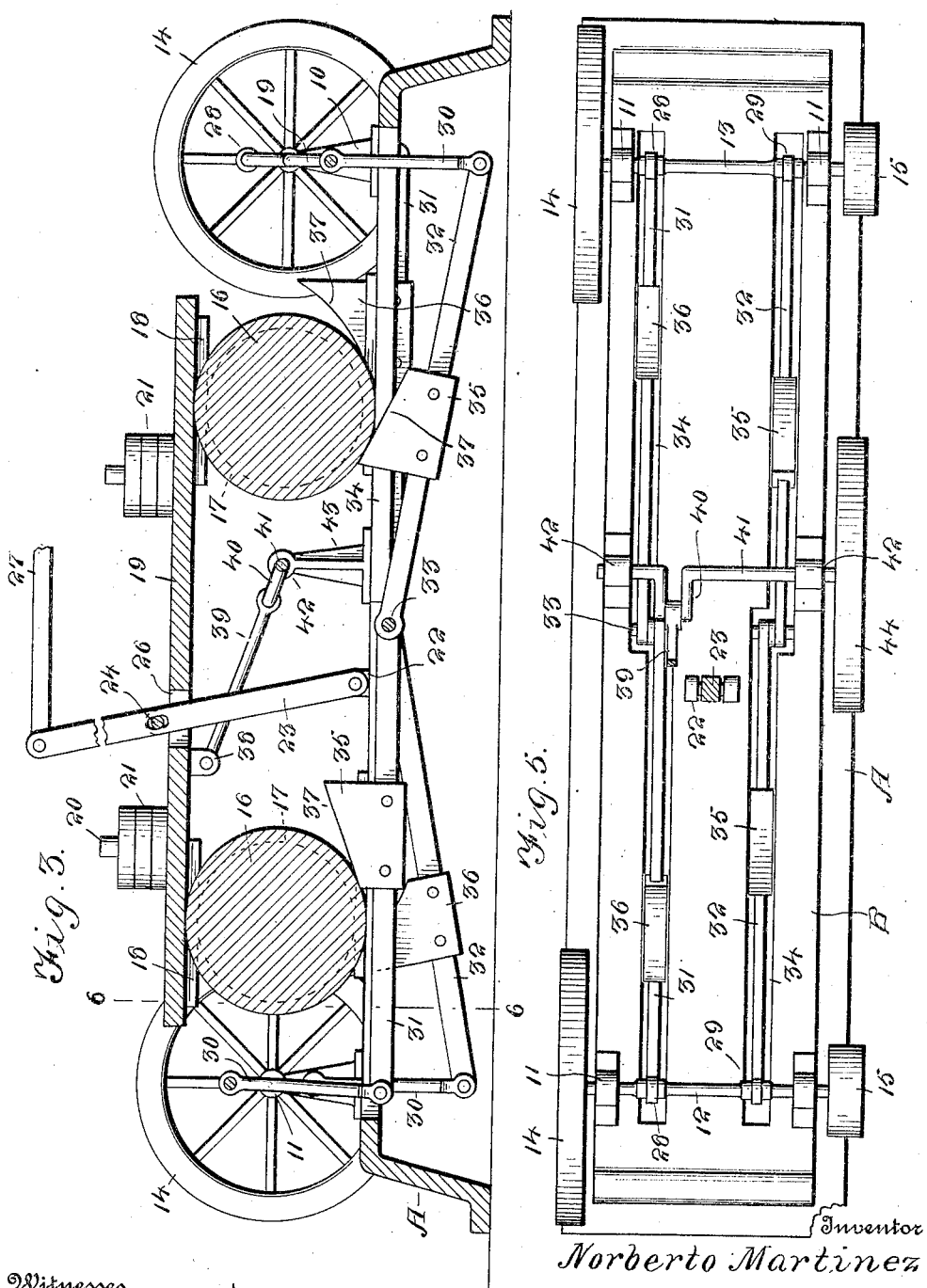

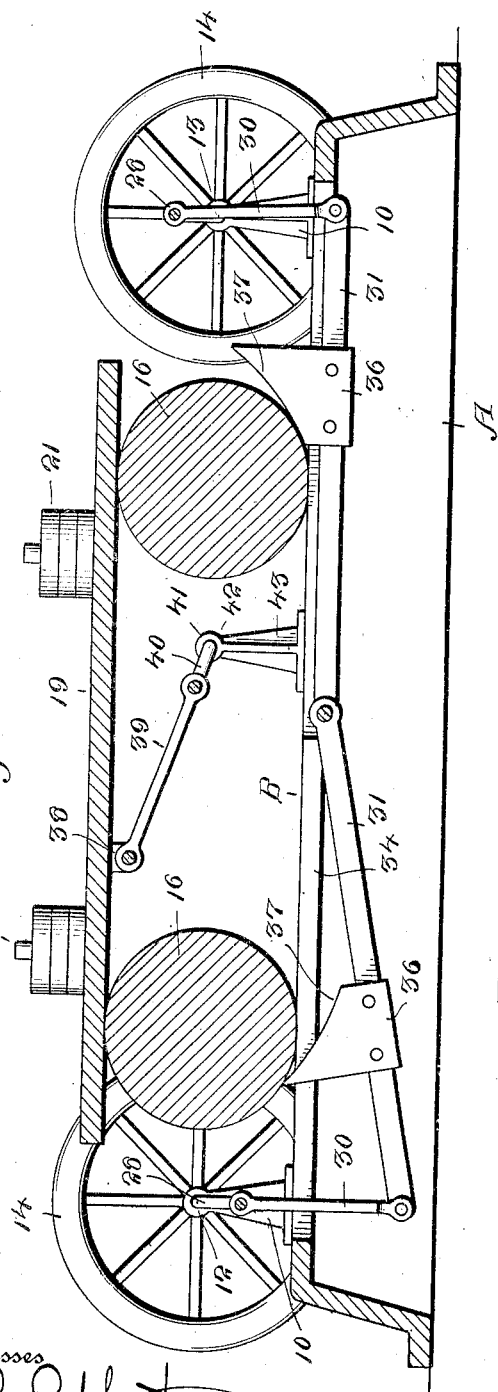
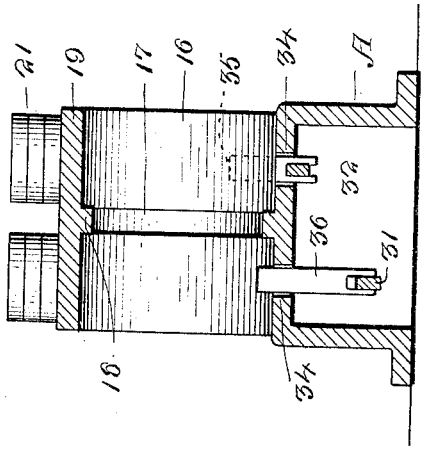

UNITED STATES PATENT OFFICE.

NORBERTO MARTINEZ, OF COTULLA, TEXAS, ASSIGNOR OF ONE-HALF TO THEOPHILUS WAHRENBERGER, OF COTULLA, TEXAS.

TRANSMISSION MECHANISM.

1,112,375.  Specification of Letters Patent.  Patented Sept. 29, 1914.

Application filed March 31, 1914. Serial No. 828,514.

*To all whom it may concern:*

Be it known that I, NORBERTO MARTINEZ, a citizen of Mexico, residing at Cotulla, in the county of Lasalle and State of Texas, have invented new and useful Improvements in Transmission Mechanism, of which the following is a specification.

The primary object of the invention is the provision of a device of this character wherein reciprocatory motion is converted into rotary motion with multiplied power, thus minimizing the driving energy with an increase in the power of the device.

Another object of the invention is the provision of a device of this character wherein lost motion is obviated, thereby deriving maximum propelling force without excessive energy.

A further object of the invention is the provision of a device of this character which is simple in construction, novel in form, reliable and efficient in operation, and inexpensive in manufacture.

Other objects will be in part obvious and in part hereinafter pointed out.

The invention accordingly consists in the construction, combination of elements and arrangement of parts which will be exemplified in the construction hereinafter set forth, and the scope of the application of which will be indicated in the appended claims.

In the drawings:—Figure 1 is a side elevation of a device constructed in accordance with the invention, showing its counter balance wheel partly broken away. Fig. 2 is a top plan view thereof. Fig. 3 is a vertical longitudinal sectional view thereof on the line 3—3 of Fig. 2. Fig. 4 is a similar view on the line 4—4 of Fig. 2. Fig. 5 is a view similar to Fig. 2, with the slide and rollers removed. Fig. 6 is a sectional view on the line 6—6 of Fig. 3.

Similar reference characters indicate corresponding parts throughout the several views in the drawings.

Referring to the drawings in detail, the device comprises a base A formed with a rest bed B on which are fixed near opposite ends thereof spaced vertical uprights 10 formed with bearings 11 in which are journaled transversely disposed shafts 12 and 13 respectively, each carrying at one end a fly wheel 14, while mounted on its opposite end is a belt pulley 15 over which is adapted to be trained a driven belt for the transmission of power from the device to machinery or the like.

Arranged on the bed B between the shafts 12 and 13 are bearing rollers 16, each being formed with a peripheral groove 17, and in these grooves engage guide ribs 18 formed on and depending from the under face of a slide or movable table 19 having mounted therein spaced from opposite ends vertical pins 20 on which are removably fitted weight blocks 21, the rollers 16 being movable longitudinally of the bed B for a limited distance, while pivoted to a bearing 22 at a point intermediate the ends of the bed B is a rocking lever 23, the same being pivoted at 24 to bearing lugs 25 formed on the slide or table 19, and this lever extends upwardly through the slot 26 in the slide or table and has pivotally connected to its upper end a throw rod 27 so that driving energy can be imparted to the lever 23 for the rocking thereof to impart movement to the slide or table 19, which in turn rotates the roller 16 on the bed B for a purpose presently described.

The shafts 12 and 13 are formed with pairs of oppositely extending cranks 28 and 29 respectively, to which are loosely connected links 30, the same being also pivoted to walking beams 31 and 32 respectively, which are supported upon a pivot 33 common to all of the beams or levers, and mounted in the base. The bed B of the base A is formed with slots 34 through which work the links 30 and the beams or levers 31 and 32, the latter being fitted with tread shoes or blocks 35 and 36 respectively, against the beveled edges 37 of which act the rollers 16 so that the levers 31 and 32 will become active for the rotation of the shafts 12 and 13. As each roller 16 travels upon the beveled edge 37 of either shoe or block 35 or 36 it causes the downward movement of the lever or beam carrying the same, and in this manner rotary movement is imparted to each shaft so that reciprocatory movement is converted into rotary movement.

Pivotally connected to a bearing 38 depending from the under side of the slide or table 19 is an arm 39, which is also loosely connected to a crank 40 formed in a rotary shaft 41 journaled in bearings 42 on standards 43 fixed to and rising from the bed B of the base, and to this shaft 41 is fixed a counter balance wheel 44 which serves to counterbalance the action of the slide or table 19, while the arm 39 serves to limit the throw thereof during the activity of the device.

It will be noted that the backward and forward movements of the roller 16 serve to move the arms or levers 31 and 32 in their order, which causes a continuous rotation to the shafts 12 and 13 and from which similar motion will be imparted to machinery or the like for driving the same. On converting the reciprocatory movement into rotary motion it will be noted that by reason of the particular arrangement the power thereof is multiplied to give maximum force to the device without increasing the driving energy.

From the foregoing it is thought that the construction and manner of operation of the device will be clearly understood, and therefore a more extended explanation has been omitted.

What is claimed is:—

1. A device of the class described comprising a support, a plurality of swinging levers, a pivot on the support and common to the levers, crank shafts journaled above the support, links loosely connected to the cranks and pivoted to the levers, beveled tread members on the levers, and roller means movable on the support for working against the tread members to displace the levers.

2. A device of the class described comprising a support, a plurality of swinging levers, a pivot on the support and common to the levers, crank shafts journaled above the support, links loosely connected to the cranks and pivoted to the levers, beveled tread members on the levers, roller means movable on the support for working against the tread members to displace the levers, and means for setting the roller members in motion.

3. A device of the class described comprising a support, a plurality of swinging levers, a pivot on the support and common to the levers, crank shafts journaled above the support, links loosely connected to the cranks and pivoted to the levers, beveled tread members on the levers, roller means movable on the support for working against the tread members to displace the levers, means for setting the roller members in motion, and means for limiting the movement of the last-named means.

4. A device of the class described comprising a support, a plurality of swinging levers, a pivot on the support and common to the levers, crank shafts journaled above the support, links loosely connected to the cranks and pivoted to the levers, beveled tread members on the levers, roller means movable on the support for working against the tread members to displace the levers, means for setting the roller members in motion, means for limiting the movement of the last-named means, and counter-balancing means coöperative therewith.

5. A device of the class described comprising a support, a plurality of swinging levers, a pivot on the support and common to the levers, crank shafts journaled above the support, links loosely connected to the cranks and pivoted to the levers, beveled tread members on the levers, roller means movable on the support for working against the tread members to displace the levers, a shiftable table supported by the roller means, and means for reciprocating the said table.

6. A device of the class described comprising a support, a plurality of swinging levers, a pivot on the support and common to the levers, crank shafts journaled above the support, links loosely connected to the cranks and pivoted to the levers, beveled tread members on the levers, roller means movable on the support for working against the tread members to displace the levers, a shiftable table supported by the roller means, means for reciprocating the said table, and means for guiding the table relative to the roller means.

7. A device of the class described comprising a support, a plurality of swinging levers, a pivot on the support and common to the levers, crank shafts journaled above the support, links loosely connected to the cranks and pivoted to the levers, beveled tread members on the levers, roller means movable on the support for working against the tread members to displace the levers, a shiftable table supported by the roller means, means for reciprocating the said table, means for guiding the table relative to the roller means, and weights supported by the table.

8. A device of the class described comprising a support, a plurality of swinging levers, a pivot on the support and common to the levers, crank shafts journaled above the support, links loosely connected to the cranks and pivoted to the levers, beveled tread members on the levers, roller means movable on the support for working against the tread members to displace the levers, a shiftable table supported by the roller means, means for reciprocating the said table, means for guiding the table relative to the roller means, weights supported by the table, and fly wheels fixed to the said shafts.

In testimony whereof I affix my signature in presence of two witnesses.

NORBERTO MARTINEZ.

Witnesses:
E. EDMONSTON, Jr.,
BURNETT F. JONES.